Patented May 25, 1954

2,679,462

UNITED STATES PATENT OFFICE 2,679,462

STRIP-RESISTANT BITUMINOUS COMPOSITION

Louis T. Monson, Puente, Calif., assignor to Petrolite Corporation, a corporation of Delaware No Drawing. Application December 18, 1951,
Serial No. 262,327

5 Claims. (Cl. 106—123)

This invention relates to the problem of securing a satisfactory bond between bituminous compositions and the various surfaces to which they are applied in industrial operations, such as road-building. This problem is well-recognized, and many attempts have been made to overcome it. For example, see U. S. Patents Nos. 2,317,959, dated April 27, 1943, to Johnson et al.; 2,361,488, dated October 31, 1944, to Mikeska; 2,386,867, dated October 16, 1945, to Johnson; 2,508,428–9, dated May 23, 1950, to Smith et al.

My invention relates to bitumen additives, which, when added in small proportions, materially improve the bond between bituminous compositions and the surfaces to which they are applied. Stated another way, my reagents will effectively reduce the degree of stripping of such bituminous compositions from such surfaces. Reagents employed for such purpose are commonly termed "anti-strippers" or "asphalt anti-strippers."

My invention further relates to bituminous compositions including small proportions of my reagents. Such bituminous compositions are useful in road construction, in water-proofing, and in coating surfaces of various kinds. Bituminous compositions which include my reagents resist stripping from the surfaces to which they are applied. In other words, they are strip-resistant, as compared with the same bitumen used in absence of my reagents.

Where the bituminous composition is to be used for water-proofing walls or paper or other surfaces, the mixture of it with my reagent is the finished or complete composition.

Finally, my invention relates to a bituminous road-construction composition including bitumen, mineral aggregate, and a small proportion of my reagent.

In road-construction use, bituminous compositions are employed in conjunction with various mineral materials, sometimes mineral materials like cinders or slags, but more usually of natural origin, such as sand, rock, etc. It is obvious that the potentially usable aggregates include all the various kinds of rock native to the localities where roads are to be built. For example, limestone, dolomite, silica, rhyolite, caliche, and sedimentary, metamorphic, or igneous rocks of various other kinds, are regularly used in road-building. Such mineral aggregates are hydrophilic in character, a fact that is generally considered to be principally responsible for the existence of the bitumen-stripping problem.

When a bituminous substance such as asphalt, in molten, cutback, or emulsified form, is applied to such hydrophilic surfaces as those of mineral aggregates, in road-building; concrete walls, in water-proofing; paper, in water-proofing, etc., it is difficult to secure prompt coating of the surface by the bituminous material. Further, it is difficult to prevent the stripping or removal of such bituminous coating from such surfaces, with time. Prevention of stripping is the more important consideration, although ease of application is frequently of material importance.

Where the surface is moist, damp, or actually soaked, the problem is obviously intensified, because the bitumen must not only coat the surface, but it must first dislodge a tenaciously held water film. Some aggregates are river gravels; when freshly-dredged they come to the job saturated with water. Rainstorms occurring during construction also produce soaked aggregates, and promote stripping. Some aggregates, like caliche and some limestones and dolomites, are quite porous and retain considerable water in the interstices after the outer surfaces of the particles seem reasonably dry.

In some cases it has been necessary first to dry the surface before applying the bituminous coating. Roadways laid in wet weather deteriorate rapidly in use. Where a bituminous roadway is subjected to water, as in low-lying areas or areas where water run-off is frequent or constant, it soon disintegrates, with the development of holes. The aggregate used in its construction is easily broken down to individual pebbles or small clumps of pebbles under such conditions, in absence of some corrective or preventive procedure, such as drying the aggregate by heat, before use.

To accomplish the foregoing objectives, my reagents are required to be employed in only very small proportions, not more than 1% by weight of such reagents being sufficient satisfactorily to control stripping in every case I have encountered. I have accordingly limited my invention to the use of not more than 1% of my reagents.

While my reagents are highly effective when used in absence of other available additives, they may be used in conjunction with, or admixed with, any other effective and compatible anti-strippers. For example, U. S. Patent No. 2,392,863, dated January 15, 1946, to Rudd, claims tall oil as an anti-stripper. My reagents are generally compatible with tall oil, and may be used for their present purpose in the presence of tall oil, or may be applied in the form of an admixture with tall oil.

Ordinarily, my reagents are added to or incorporated in the bituminous component before it is incorporated into any mixture. For example, they may be added to molten asphalt or to cutback asphalt. If desired, my reagents may be added to the mixer in which the bituminous material and the mineral aggregate are being mixed. In the case of bituminous emulsions, my reagents may be added to the emulsion after it has been produced or to the bituminous component of such emulsions, before emulsification. The procedure of incorporating my reagents is relatively immaterial; the important thing is that they be as uniformly distributed throughout the finished composition as is possible.

My reagents consist of acylated aminoalcohols in which an acyloxy radical derived from a detergent-forming acid having from 8 to 32 carbon atoms is joined to a basic nitrogen atom by a carbon atom chain, or a carbon atom chain which is interrupted at least once by an oxygen atom. The aminoalcohols may have more than one amino radical, or, for that matter, more than one basic amino radical. The compounds herein contemplated are well known compounds and are produced by conventional precedures. Stated another way, the compounds herein contemplated are esters of aminoalcohols which may contain ether linkages as well as more than one amino nitrogen atom.

More specifically, my reagent is an acylated derivative of a basic aminoalcohol, the parent aminoalcohol having the formula

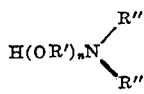

said derivative being such that there is at least one occurrence of the radical RCO, which is the acyl radical of a monocarboxy detergent-forming acid having at least 8 and not more than 32 carbon atoms; the amino nitrogen atom is basic; R'' is a member of the class consisting of alkanol radicals, aminoalkanol radicals, and polyaminoalkanol radicals, in which polyaminoalkanol radicals the amino nitrogen atoms are united by divalent radicals selected from the class consisting of alkylene radicals, alkyleneoxyalkylene radicals, hydroxyalkylene radicals, and hydroxyalkyleneoxyalkylene radicals, and all remaining amino nitrogen valences are satisfied by hydroxyalkyl radicals, including those in which the carbon atom chain is interrupted at least once by an oxygen atom; R' is an alkylene radical having at least 2 and not more than 4 carbon atoms; and $n$ is a small whole number varying from 1 to 10; RCO being a substituent for a hydroxyl hydrogen atom; and the molecular weight of said compound being at least 273 and not over 4,000.

Reference to a basic amino nitrogen atom is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, second edition, page 253.)

Reference to an amine and the subsequent amino compounds is intended to include the salts, and the anhydro base, as well as the hydrated base, since both obviously are present when water is treated with an amine or amino compound. ("In an aqueous solution of the amine, the anhydro base, R—NH₂, the hydrated base, $$R—NH_3—OH$$

and the two ions are all present." Richter, s. v., page 252.)

My reagents are old and well-known products. Thus, U. S. Patent No. 2,324,488 describes certain hydroxylated acylated amino-ether compounds. No. 2,324,489 describes certain hydroxylated acylated monoamino compounds free from ether linkages. No. 2,324,490 describes certain basic hydroxylated acylated polyamino compounds free from ether linkages. Such amino reactants of said patents are included among my reagents here. The acylated aminoalcohols described collectively in the aforementioned three patents are used as reactants for combining with a fractional acidic ester. Thus, said acylated aminoalcohols must have present an alcoholiform hydroxyl as part of an acyl radical, or as part of a substituent for an amino hydrogen atom. In the instant case, such acylated aminoalcohols are not employed as reactants except as to salt-formation reactions, and the hydroxyl group is not functional. Thus, one may employ, not only the acylated aminoalcohols described in the three aforementioned United States patents, but also the obvious analogs in which there is no hydroxyl radical present.

It is well known that certain monocarboxy organic acids containing eight carbon atoms or more, and not more than 32 carbon atoms, are characterized by the fact that they combine with alkali to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids, one might employ the chlorinated fatty acids. Instead of the resin acids, one might employ the hydrogenated resin acids. Instead of naphthenic acids, one might employ the hydrogenated resin acids. Instead of naththenic acids, one might employ brominated naphthenic acids, etc.

The fatty acids are of the type commonly referred to as higher fatty acids; and of course, this is true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

My present acylated aminoalcohols are preferably derived at least in part from unsaturated fatty acids having 18 carbon atoms. Such unsaturated fatty acids include oleic, ricinoleic, linolic, and linolenic acids. Mixed fatty acids, like those obtained by the hydrolysis of oils or fats, may be employed. Acids which have been hydroxylated by subjection to oxidation are acceptable reactants. In addition to synthetic carboxy acids obtained by the oxidation of paraffins or the like, there is the somewhat analogous class obtained by treating carbon dioxide or carbon monoxide, in the presence of hydrogen or an olefine, with steam or by causing a halogenated hydrocarbon to react with potassium cyanide and saponifying the product obtained. Such products or mixtures thereof, having at least 8 and not more than 32 carbon atoms, and having one carboxyl group or equivalent, are suitable as detergent-forming monocarboxy acids. Another analogous class, equally suitable, is the mixture of carboxylic acids obtained by the alkali treatment of alcohols of higher molecular weight formed in the catalytic hydrogenation of carbon monoxide. Commercial tallol, which is a mixture of oleic and rosin acids, is quite inexpensive; and for this reason, if for no other, it is my preferred reactant of the class of monocarboxy detergent-forming acids.

Of course, as is well known, it is not necessary to use the free monocarboxy detergent-forming acid itself for introducing the acyl group or acyloxy group. Any suitable functional equivalent, such as the acyl halide, anhydride, ester, amide, etc., may be employed.

Suitable primary and secondary amines, which may be employed to produce materials of the kind above described, include the following: Diethanolamine, monoethanolamine, ethylethanolamine, methylethanolamine, propanolamine, dipropanolamine, propylpropanolamine, etc. Other examples include cyclohexylolamine, dicyclohexylolamine, cyclohexylethanolamine, cyclohexylpropanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: Triethanolamine, diethanolalkylamines such as diethanolethylamine, diethanolpropylamine, etc. Other examples include diethanolmethylamine, tripropanolamine, dipropanolmethylamine, cyclohexanoldiethanolamine, dicyclohexanolethanolamine, cyclohexyldiethanolamine, dicyclohexylethanolamine, dicyclohexanolethylamine, benzyldiethanolamine, benzyldipropanolamine, tripentanolamine, trihexanolamine, hexyldiethanolamine, octadecyldiethanolamine, etc.

Additional amines include ethanoldiethylamine, propanoldiethylamine, ethanoldipropylamine, propanoldipropylamine, dibenzylethanolamine, etc. Ether-type aminoalcohols may be obtained from the above-mentioned aminoalcohols, for example, by treating them with one or more moles of an oxyalkylating agent such as ethylene oxide, propylene oxide, butylene oxide, glycid, etc. It is to be noted that comparable products are obtained by treating primary or secondary amines other than arylamines with an olefin oxide. Aminoalcohols containing a primary or secondary amino group, i. e., having at least one or two amino hydrogen atoms present, may be employed under especially controlled conditions to give an ester, rather than an amide. One procedure is to permit amidification to take place, and then cause a rearrangement to the ester form. See U. S. Patent No. 2,151,788, dated March 28, 1939, to Mauersberger.

Where oxyalkylation is employed as a means of introducing hydroxyl groups into any of the foregoing amines, or for introducing ether groups, I prefer that such oxyalkylation not be extensive. My reason is that, as the proportion of oxyalkylene groups increases, so does the hydrophile character of the products increase. Excessive hydrophile character in the products in general reduces the anti-stripping qualities of the reagents. I therefore prefer to limit the oxyalkylation step to produce just the number of hydroxyl groups required in the acylation step or slightly in excess thereof.

A preferred aminoalcohol reactant for producing my reagents is commercial triethanolamine. A second preferred reactant of this class is the still residue obtained in the manufacture of alkanolamines. Alkanolamines, such as the ethanolamines and isopropanolamines, are commonly produced by reacting ammonia with an alkylene oxide, such as ethylene oxide or propylene oxide. In this process, mono-, di-, and tri-alkanolamines are successively formed. These are separated by distillation, preferably at reduced pressures. The residue in the still, probably consisting largely of polymerized trialkanolamines, is an inexpensive material, which is usable as the aminoalcohol reactant in preparing my reagents.

*Example 1*

React 298 grams ricinoleic acid with 298 grams of triethanolamine at approximately 200–250° C. for approximately 10 hours, until esterification is substantially complete.

*Example 2*

Repeat Example 1 but use 447 grams of triethanolamine, and extend the heating period to about 12 hours.

*Example 3*

Repeat Example 1 but use 596 grams triethanolamine and increase the heating period to about 14 hours.

*Example 4*

Heat 324 grams commercial tallol with 447 grams of commercial triethanolamine at about 200–250° C. for about 12 hours.

*Example 5*

Substitute 308 grams of castor oil for the 298 grams of ricinoleic acid in Examples 1, 2, and 3, above; and react it, respectively, with 298 grams, 447 grams, and 596 grams of triethanolamine as there specified.

*Example 6*

Heat triethanolamine at about 200–250° C. for about 8 hours to produce a polymerized amine of the following probable composition:

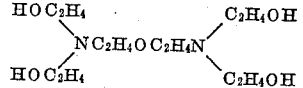

React 280 grams of the polymerized amine with 200 grams of methyl naphthenate for 12 hours at about 200–250° C.

*Example 7*

Heat triethanolamine for about 10 hours at 200–250° C. to produce a polymerized amine of the following probable composition:

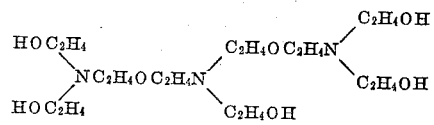

React 393 grams of the polymerized amine with 324 grams of commercial tallol for about 6 hours at 200–250° C.

*Example 8*

Oxyethylate 290 grams of commercial triethanolamine with 308 grams of ethylene oxide in conventional manner. React 562 grams of the oxyethylated triethanolamine with 282 grams of oleic acid for about 10 hours at 200–250° C.

Example 9

React the oxyethylated triethanolamine of Example 8 above, 1124 grams, with commercial tallol, 324 grams, for about 12 hours at 200–250° C.

Example 10

Oxypropylate 290 grams of commercial triethanolamine with 406 grams of propylene oxide in conventional manner. React 646 grams of the oxypropylated triethanolamine with 308 grams of castor oil for about 10 hours at 200–250° C.

Example 11

React the oxypropylated triethanolamine of Example 10 above, 1292 grams, with commercial tallol, 324 grams, for about 12 hours at 200–250° C.

As stated above, one of the most desirable aminoalcohol reactants to be employed in producing my reagents is triethanolamine. I have found that the most effective reagents produced from triethanolamine are those in which the molal ratio of aminoalcohol to acylating reactant lies approximately between 2-to-1 and 4-to-1. Where less than about 2 mols of aminoalcohol are present, the reaction does not proceed very satisfactorily. Where more than about 4 mols of aminoalcohol are present, per mol of acylating reactant, the effectiveness of the product as an anti-stripper appears to decline somewhat.

As a preferred example of the production of my reagents, the following may be recited: Heat 450 grams of commercial tall oil with 756 grams of commercial triethanolamine for about 8 hours at about 225–255° C.

I have likewise stated above that another highly desirable aminoalcohol reactant is the still bottoms or residues from alkanolamine manufacture.

Where the acyl-radical-supplying reactant used to prepare my reagents is of indefinite composition, an approximate molecular weight only is available. For example, tallol, a mixture of linoleic, oleic and rosin acids, may be quoted as having a saponification number of, for example, 165–180. Its acid number will usually be nearly the same as its saponification number. To obtain a value which may be used as an approximation of its mean molecular weight, it is usually most practical to determine acid number, and calculate the molecular weight from that value. I usually use 324 as the mean molecular weight of tallol, in absence of a precise value.

Where the aminoalcohol is a still bottoms or residue from ethanolamine manufacture, its molecular weight is likewise somewhat indefinite. I have therefore employed a value of 155 for its molecular weight, recognizing that this is an approximation.

Examples involving tallol and such ethanolamine residues are stated on the basis of estimated molecular weights of 324 and 155, respectively, for tallol and ethanolamine residue.

For the foregoing reasons, it is obviously difficult in some cases to express exactly the preferred range of molal ratios of tallol-to-alkanolamine residue; but I have stated that my preferred range of molal ratios of acyl-radical-supplying reactant to aminoalcohol reactant is from approximately 1-to-2 to 1-to-4. This statement applies to reagents produced from tallol and alkanolamine residues.

As a second preferred example, the following may be given: Heat 338 grams commercial tall oil with 520 grams of the alkanolamine residue known as Dow alkanolamine SB for about 9 hours at 225–265° C. Amine residue T (Carbide & Carbon Chemicals Corp.'s brand of ethanolamine residue) may be substituted for the Dow product, gram-for-gram, in this example.

Some of the acylated aminoalcohols included among my reagents are readily dispersible in water in the free state. Presumably such aqueous systems comprise the reagent in the form of a base, i. e., a substituted ammonium compound. In other instances, the free forms of the reagents are substantially water-insoluble, but the salt forms, e. g., the acetates, are very water-dispersible. If one wishes to employ the salt form of any of my reagents, the acetate, hydroxyacetate, lactate, gluconate, phthalate, chloride, nitrate, sulfate, or other salt may be employed. In general, it is not usually necessary to employ the salt form; and the salt forms are generally detectably inferior in effectiveness to the free forms of my reagents.

For various reasons, including viscosity, I prefer to employ my reagents in the form of solutions in a suitable solvent. In some instances, especially where salt forms of my reagents are desired or required, water may be the solvent selected, because of cost considerations. Where the reagent is water-insoluble or where water is unacceptable as a solvent, for temperature or other reasons, various organic solvents may be employed. Aromatic petroleum solvent, sulfur dioxide extract, petroleum distillates of various kinds, may be used. The solvent is not a material part of my invention. Any suitable solvent may be employed; usually the selection will be on the basis of cost. I prefer aromatic petroleum solvent because of its good solvent power and low cost. When my preferred reagents, described above, are mixed with aromatic petroleum solvent in equal volumes, a solution of satisfactory viscosity is produced. It is the preferred form of employing my reagents.

My reagents may be added to asphalt, for example, at the refinery. This is a desirable procedure where large volumes are to be handled or where the asphalt is so heavy-bodied as to require heating to insure uniform distribution of the anti-stripper. Where conditions in the field are such that adequate mixing is achieved, my reagents may be added there, as the asphalt is used. My reagents appear to be quite stable at the usual storage and working temperatures of asphalt.

If the reagent is added at the refinery, the following example of procedure is practicable: Place the bituminous material or asphalt in a tank containing heating coils and bring it to a temperature at which its viscosity is relatively low. Add 1 pound of either of my preferred reagents (in the form of a 50% solution in aromatic petroleum solvent) to every 133 pounds of bitumen, a ratio of 0.75%. If the asphalt is SC-6 or penetration grade asphalt, considerable heating will be required to bring the asphalt to acceptably fluid state. Pour in the desired proportion of reagent and mix it in the asphalt by rolling with gas, recycling through a mixing tank with mixing-type pumps, or stirring with a propeller or other tank-type stirrer. The bituminous mixture so prepared is delivered to the job ready for use in any desired method of application.

This may be, for example, direct application by spraying it on already-laid aggregate; application to a continuous road-mixing unit; or addition to a hot-mix plant. The reagent-asphalt mixture may be sprayed or poured for seal-coat application in the conventional manner. The presence of the reagent does not adversely affect the properties of the asphalt, or the application of the latter; the bituminous material is handled exactly as if no reagent had been added.

Where small batches of several-barrel size are involved, addition of the reagent may take place in the field, followed by hand stirring until a uniform distribution of reagent has been achieved.

Where the reagent is to be incorporated in an emulsified bituminous composition, it may be added to the bitumen ingredient in the manner just described; or it may be added to the finished emulsion my simply stirring it in in the desired proportion in any conventional manner. The salt form of the reagent may be preferable in such latter instances. I have added my preferred reagent, in 50% solution in aromatic petroleum solvent, to emulsified asphalt to produce a highly strip-resistant composition.

If desired, my reagents may be added to and mixed with the aggregate before it is coated with the bituminous composition. While this is a less common procedure, it is perfectly feasible, especially where the reagent is sufficiently water-dispersible to give a reasonably stable dispersion, which can be quite uniformly distributed throughout the aggregate.

A number of laboratory techniques have been proposed to evaluate anti-strippers. All or nearly all of them include the operation of coating some surface with a bituminous composition, subjecting the coated surface to stripping conditions, and appraising the degree of stripping that has taken place. My reagents demonstrate their effectiveness strikingly in such tests.

One such test subjects a measured amount of mineral aggregate to a measured amount of water; thereafter coats the aggregate with the bitumen or bitumen-additive mixture; cures or ages the coated sample for a definite period of time; then strips the coated aggregate with water at a definite temperature and for a definite time; and thereafter, usually by visual examination, determines the percentage of the aggregate particles that have been stripped of their original bituminous coating.

Within the terms, "bitumen," "bituminous compositions," "bituminous materials," and similar expressions including the word "bituminous," I mean to include natural asphalt, petroleum still residues of paving grade, plastic residues from coal tar distillation, petroleum pitch, solutions of such substances like cut-back asphalts, emulsions thereof, and the like.

It has been mentioned above that still bottoms or still residues from alkanolamine manufacture may be employed as reactants in producing my reagents. Because the composition of such residues is naturally not well-defined, it may be desirable to describe them somewhat further here. It is known they include, for example, triethanolamine or tripropanolamine, depending on the manufacturing operation which produced them; but the polymers present are not of definite or established composition. This is inconsequential, in view of their open-market availability, above noted.

Such residues have been described in U. S. Patent 2,568,745 as follows:

"By reacting the alkylene oxides, e. g., ethylene, isopropylene, and isobutylene oxides with ammonia primary, secondary and tertiary alkylolamines are the principal products formed. These reactions are exothermic and an operating temperature of 50 degrees C. to 60 degrees C. is usually satisfactory. If technical 28% aqueous ammonia is employed, primary, secondary and tertiary amines are obtained in varying proportions, dependent entirely on the alkylene oxide-ammonia ratio. In rectification of the reaction mixture the various amines are separated by distillation. The tertiary alkylolamine, being the highest boiling member, comes over last. In commercial operations there is a gradual accumulation of still bottoms or still residues consisting of materials having boiling points above 280 degrees C. at atmospheric pressure and considerably in excess of the corresponding tertiary alkylolamine. There is no authentic information as to the constitution of these residues.

"The preferred alkylene oxide-ammonia residue is derived from the manufacture of commercial triethanolamine from ethylene oxide and ammonia. The material is a dark, very viscous, hygroscopic liquid which boils above 244 degrees C. at 50 mm.

"The manufacture of the following primary, secondary and tertiary alkylolamines from alkylene oxides and ammonia results in the formation of still residues which would be suitable starting materials for the purpose of the invention: diethanolamine, octylethanolamine, cyclohexylethanolamine, dipropanolamine, propylpropanolamine, benzylethanolamine, propyldiethanolamine, tripropanolamine, methyldipropanolamine, cyclohexyldiethanolamine, ethyldicyclohexanolamine, trihexanolamine, 2-amino-2-methyl-1-propanol, octadecyldiethanolamine and polyethanolamine."

Such alkanolamine residues and mixtures thereof may be used directly to produce my reagents, or they may be further polymerized by heating at temperatures comparable to those employed above in connection with triethanolamine, before being so used. I prefer to employ them as purchased, without further heat-processing alone, before acylation is undertaken by heating in the presence of the acylating reactant.

Such acylation procedure may be continued for various periods of time, up to the point where the reaction mass becomes rubbery and unworkable.

Having thus described my invention, what I claim as new and desire to secure by Letters Patent is:

1. A strip-resistant bituminous composition including an asphalt and not more than 1% of an ester obtained by heating one equivalent of a material selected from the class consisting of (1) mono-carboxy detergent-forming acids characterized by a carbon-linked group containing 7 to 31 carbon atoms connected to the carboxy group and in which the carboxy group is the only ester-forming group and (2) their glyceride esters, with from about 2 to about 4 moles of an alkylolamine, each amino nitrogen atom in such alkylolamine being linked to 3 carbon atoms, of which each carbon atom linked to a nitrogen atom is part of an alkylene group having 2 to 4 carbon atoms, the amino nitrogen atoms in such ester being connected together by carbon-linked chains interrupted by oxygen.

2. The composition as in claim 1, wherein the alkylolamine is triethanolamine.

3. The composition as in claim 1, wherein the alkylolamine is the still residue produced in the manufacture of ethanolamines.

4. The composition as in claim 1, wherein the ester is that obtained by heating one mole of tall oil with from about 2 to about 4 moles of triethanolamine.

5. The composition as in claim 1, wherein the ester is that obtained by heating one mole of tall oil with from about 2 to about 4 moles of the still residue produced in the manufacture of ethanolamines.

References Cited in the file of this patent

UNITED STATES PATENTS

| Number | Name | Date |
|---|---|---|
| 2,228,989 | De Groote | Jan. 14, 1941 |
| 2,322,202 | Jayne et al. | June 15, 1943 |
| 2,429,445 | Young I | Oct. 21, 1947 |
| 2,483,253 | Young II | Sept. 27, 1949 |
| 2,514,954 | Johnson et al. | July 11, 1950 |

FOREIGN PATENTS

| Number | Country | Date |
|---|---|---|
| 515,882 | Great Britain | Dec. 18, 1939 |